(12) United States Patent
Ookuma et al.

(10) Patent No.: US 9,879,724 B2
(45) Date of Patent: Jan. 30, 2018

(54) BEARING STRUCTURE

(71) Applicant: NISSAN MOTOR CO., LTD., Kanagawa (JP)

(72) Inventors: Satoru Ookuma, Kanagawa (JP); Hiroaki Hoshikawa, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 15/503,239

(22) PCT Filed: Aug. 11, 2014

(86) PCT No.: PCT/JP2014/071151
§ 371 (c)(1),
(2) Date: Feb. 10, 2017

(87) PCT Pub. No.: WO2016/024308
PCT Pub. Date: Feb. 18, 2016

(65) Prior Publication Data
US 2017/0268569 A1    Sep. 21, 2017

(51) Int. Cl.
*F16C 9/02* (2006.01)
*F16C 33/10* (2006.01)
*F16C 17/10* (2006.01)

(52) U.S. Cl.
CPC ............ *F16C 33/1065* (2013.01); *F16C 9/02* (2013.01); *F16C 17/10* (2013.01); *F16C 2360/22* (2013.01)

(58) Field of Classification Search
CPC ........ F16C 33/1065; F16C 9/02; F16C 17/10; F16C 2360/22; F02B 75/048
See application file for complete search history.

(56) References Cited

U.S. PATENT DOCUMENTS

| 8,826,882 B2* | 9/2014 | Tanabe | F01M 11/02 123/196 R |
| 9,670,872 B2* | 6/2017 | Hoshikawa | F16C 9/02 |
| 2016/0208687 A1* | 7/2016 | Okuma | F16C 23/041 |

FOREIGN PATENT DOCUMENTS

| EP | 3012434 A1 | 4/2016 |
| JP | H06-346913 A | 12/1994 |

(Continued)

OTHER PUBLICATIONS

International Preliminary Report on Patentability from PCT/JP2014/071151, with English translation of annex, dated Sep. 8, 2015 (15 pages).

(Continued)

*Primary Examiner* — Thomas R Hannon
(74) *Attorney, Agent, or Firm* — Osha Liang LLP

(57) ABSTRACT

A bearing structure has a crankshaft rotatably supported by a crankshaft bearing part, formed of a cylinder block of an internal combustion engine and a first bearing cap, through a bearing metal, a second shaft rotatably supported by a second shaft bearing part formed of the first bearing cap and a second bearing cap, wherein the bearing metal has a bearing metal planar portion for rotatably supporting the crankshaft with an entire inner peripheral surface of the bearing metal, the inner peripheral surface at which the bearing metal planar portion is formed, a bearing metal oil groove portion formed with an oil groove formed to extend circumferentially in an inner peripheral surface of the bearing metal, the inner peripheral surface at which the bearing metal oil groove portion is formed, a first oil hole opening at the oil groove, and a second oil hole opening at the oil groove.

4 Claims, 5 Drawing Sheets

(56) References Cited

FOREIGN PATENT DOCUMENTS

| JP | 2004-116434 A | 4/2004 |
| JP | 2005-140090 A | 6/2005 |
| JP | 2008-075631 A | 4/2008 |
| JP | 2010-185329 A | 8/2010 |

OTHER PUBLICATIONS

International Preliminary Report on Patentability issued in corresponding Application No. PCT/JP2014/071151, dated Feb. 16, 2017 (9 pages).

* cited by examiner

BEARING STRUCTURE

BACKGROUND

Technical Field

The present invention relates to a bearing structure and, for example, to a bearing structure for a crankshaft in a multi-link-type piston crank mechanism.

Related Art

For example, in a patent document 1, as a piston crank mechanism in an internal combustion engine, there is disclosed a multi-link-type piston crank mechanism having a lower link supported by the crank pin of a crankshaft, an upper link connecting the one end portion of the lower link to a piston pin, and a control link connecting the other end portion of the lower link to the eccentric shaft part of a control shaft.

In such a multi-link-type piston crank mechanism, a crankshaft and a control shaft are required to be rotatably supported individually. The patent document 1 discloses a bearing structure where the crankshaft is supported between the bulkhead of a cylinder block and a main bearing cap, and a control shaft bearing cap is attached to the underside of the main bearing cap, and the control shaft is supported between the main bearing cap and the control shaft bearing cap.

In addition, the control shaft bearing cap has a bearing beam structure in which a plurality of bearing caps are connected in a ladder form by a beam part extending in an engine longitudinal direction, and is configured to supply lubricating oil to the control shaft bearing part from an oil gallery formed in the beam part.

However, for the configuration as in patent document 1 in which the lubricating oil is supplied to the control shaft bearing part through the inside of the beam part, it may be necessary to form the control shaft bearing cap in the bearing beam structure, thereby leading to a low flexibility of design.

Patent Document 1: Japanese Patent Application Publication 2004-116434

SUMMARY OF THE INVENTION

A bearing structure according to one or more embodiments of the present invention has a bearing metal rotatably supporting a first shaft, bearing metal which is attached to a first shaft bearing part formed of a block and a first bearing cap, and a second shaft bearing part rotatably supporting a second shaft. In addition, the bearing metal has a bearing metal planar portion for rotatably supporting the first shaft with the entire inner peripheral surface of the bearing metal, inner peripheral surface at which the bearing metal planar portion is formed, a bearing metal oil groove portion formed with an oil groove formed to extend circumferentially and entirely in the inner peripheral surface of the bearing metal, inner peripheral surface at which the bearing metal oil groove portion is formed, a first oil hole including one end opening at the oil groove and including the other end communicating with the lower end of an in-block oil passage that extends from the oil gallery of the block to the first shaft bearing part, and a second oil hole including one end opening at the oil groove and including the other end communicating with the upper end of an in-cap oil passage that extends from the first shaft bearing part to the second shaft bearing part.

According to one or more embodiments of the present invention, lubricating oil is supplied from the oil gallery of the block to the second shaft bearing part through the first shaft bearing part, and therefore the flexibility of the design of the second shaft bearing part is enhanced.

DETAILED DESCRIPTION

Embodiments of the present invention are explained in detail below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
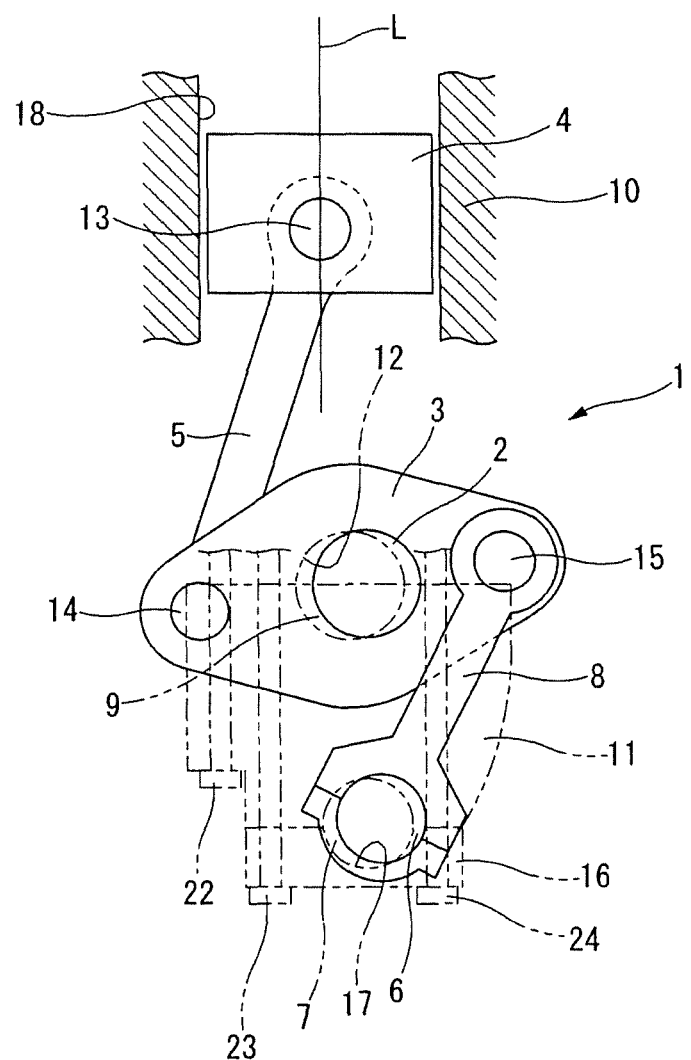
FIG. 1 is an explanation drawing schematically showing a configuration diagram of a multi-link-type piston crank mechanism according to one or more embodiments of the present invention.

FIG. 1 is an explanation drawing schematically showing the configuration diagram of a multi-link-type piston crank mechanism 1 according to one or more embodiments of the present invention. This multi-link-type piston crank mechanism 1 has a lower link 3 rotatably attached to a crank pin 2, an upper link 5 connecting the lower link 3 with a piston 4, a control shaft 7 as a second shaft in which an eccentric shaft part 6 is provided, and a control link 8 connecting the eccentric shaft part 6 with lower link 3.

A crankshaft 9 as a first shaft is rotatably supported by a crankshaft bearing part 12 as a first shaft bearing part, crankshaft bearing part 12 which is formed by a cylinder block 10 as a block and a main bearing cap 11 as a first bearing cap.

The one end of the upper link 5 is rotatably connected to the piston 4 through a piston pin 13, and the other end of upper link 5 is rotatably connected to the one end portion of lower link 3 through a first link pin 14.

The one end of the control link 8 is rotatably connected to the other end portion of lower link 3 through a second link pin 15, and the other end of control link 8 is rotatably connected to eccentric shaft part 6.

The control shaft 7 is arranged at the underside of the crankshaft 9 parallel to crankshaft 9, and is rotatably supported by a control shaft bearing part 17 as a second shaft bearing part, control shaft bearing part 17 which is formed by the main bearing cap 11 and a control shaft bearing cap 16 as a second bearing cap. Control shaft 7 is rotatably driven by an actuator which is not shown in the drawings, and its rotation position is controlled. In addition, the actuator may be an electric motor or a hydraulic drive type actuator.

In multi-link-type piston crank mechanism 1, when control shaft 7 is rotated by the actuator, the central position of eccentric shaft part 6 is shifted, and the swing support position of the other end of control link 8 is then shifted. When the swing support position of control link 8 is shifted, the movement-restriction of piston 4 in a cylinder 18 is changed, and the position of piston 4 in a piston top dead center (TDC) is then changed higher or lower. Thus, it becomes possible to change the compression rate of an engine.

Figure 2:
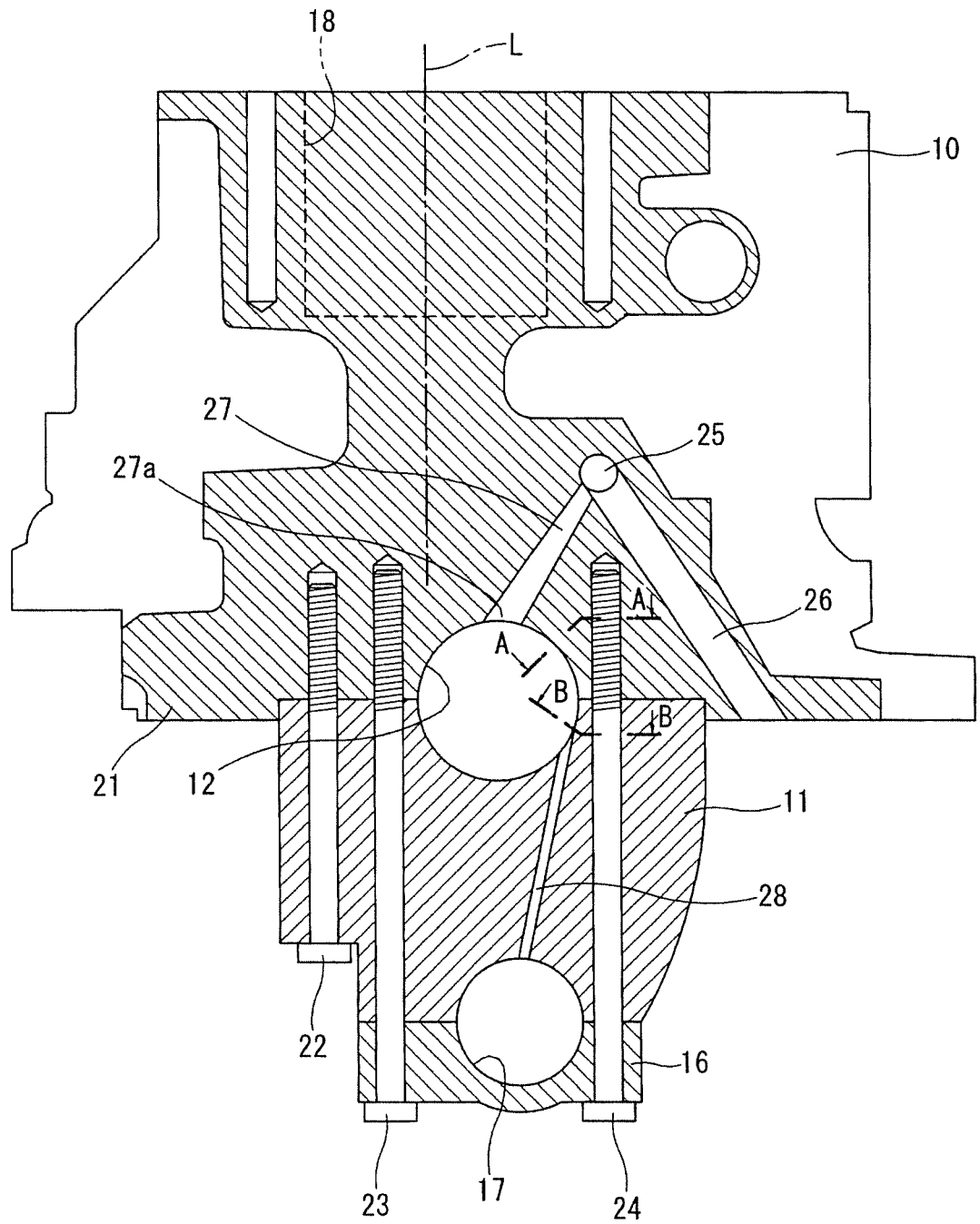
FIG. 2 is a sectional view schematically showing a bearing structure according to one or more embodiments of the present invention.

As shown in FIG. 2, main bearing cap 11 is attached to the underside of the cylinder block 10, specifically, the underside of a bulkhead 21 between cylinders, by three bolts 22, 23 and 24. In addition, the control shaft bearing cap 16 is attached to the underside of main bearing cap 11. Specifically, two bolts 23 and 24 of the three bolts 22 to 24 extend through both of main bearing cap 11 and control shaft bearing cap 16, and fix both of main bearing cap 11 and control shaft bearing cap 16 to cylinder block 10 in a so-called common fastening manner. As shown in FIG. 2, two bolts 23 and 24 extend on respective sides of crankshaft bearing part 12 and control shaft bearing part 17 which are in the form of a circular opening portion. The joint plane between main bearing cap 11 and the bulkhead 21 and the joint plane between main bearing cap 11 and control shaft bearing cap 16 are parallel to each other, and are perpendicular to a central axis L of the cylinder 18.

In addition, each of bolts 22 to 24 may be a normal bolt provided with a head portion, or a stud bolt that is used in combination with a nut.

Next, a system for supplying lubricating oil to crankshaft bearing part 12 and control shaft bearing part 17 is explained.

As shown in FIG. 2, an oil gallery 25 is formed in cylinder block 10, extending straight in the direction of the array of cylinders. The oil gallery 25 is positioned close to the upper side of a skirt portion closer to control link 8, and communicates with the discharge side of an oil pump which is not shown in the drawings through an oil supply passage 26.

An in-block oil passage 27 is connected to oil gallery 25. The lubricating oil is supplied from oil gallery 25 to crankshaft bearing part 12 through the in-block oil passage 27 extending through the inside of bulkhead 21. In-block oil passage 27 is an oil passage having a straight shape, which is formed by drilling from the underside of cylinder block 10, and extends from oil gallery 25 toward the top portion of crankshaft bearing part 12 having a circular shape, with inclination from the central axis L of cylinder 18.

In addition, an in-cap oil passage 28 is formed inside main bearing cap 11 to supply a part of the lubricating oil supplied to crankshaft bearing part 12 to control shaft bearing part 17.

The in-cap oil passage 28 is an oil passage having a straight shape, which is formed by drilling in main bearing cap 11. The upper end of in-cap oil passage 28 is opened at the side portion of control link 8 side of crankshaft bearing part 12, and the lower end of in-cap oil passage 28 is opened at the top portion of control shaft bearing part 17 having a circular shape. In-cap oil passage 28 is inclined from central axis L of cylinder 18.

Here, as shown in FIG. 2, in a state in which central axis L of cylinder 18 has been set vertical, the center of crankshaft bearing part 12 and the center of control shaft bearing part 17 are offset slightly from each other in the lateral direction. Specifically, the center of control shaft bearing part 17 is slightly closer to the right side in FIG. 2, that is, closer to control link 8, with respect to the center of crankshaft bearing part 12.

In addition, as is clear from FIG. 2 and others, the diameter of control shaft 7 (specifically, the diameter of the journal portion of control shaft 7) is smaller than the diameter of crankshaft 9 (specifically, the diameter of the journal portion of crankshaft 9).

Next, oil passages in crankshaft bearing part 12 and control shaft bearing part 17 are explained with reference to FIG. 3 to FIG. 7. In addition, in FIG. 3, crankshaft bearing part 12 and control shaft bearing part 17 are drawn so as to be close to each other for convenience for showing them in the figure. The dimension of in-cap oil passage 28 is therefore shorter than the original dimension of in-cap oil passage 28.

Figure 3:
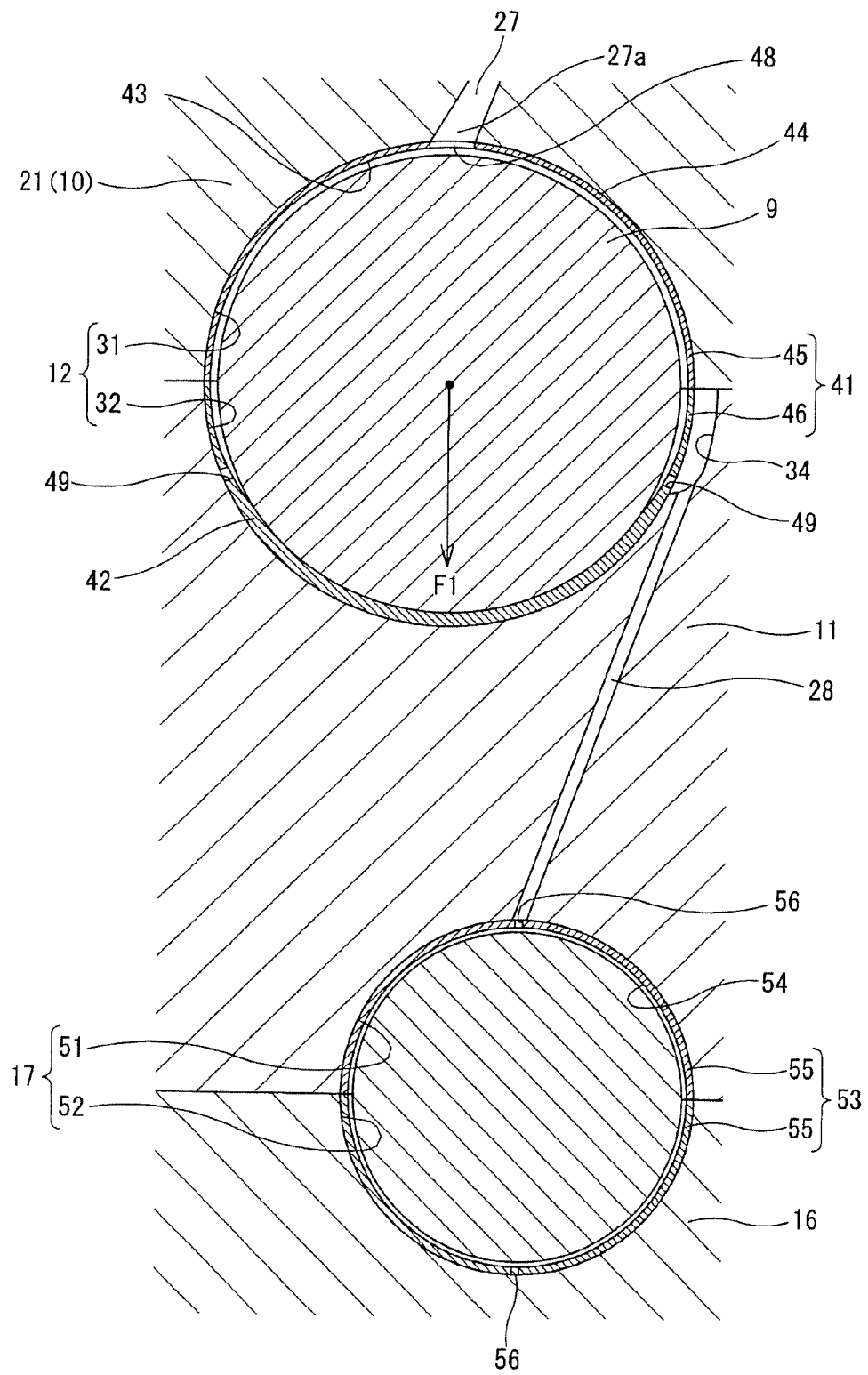
FIG. 3 is a sectional view showing details of oil passages of a crankshaft bearing part and a control shaft bearing part.

As shown in FIG. 3, crankshaft bearing part 12 is formed of a cylinder-block-side bearing surface 31 having a semi-circular section which is formed in bulkhead 21 and a main-bearing-cap-side bearing surface 32 having a semi-circular section which is formed in main bearing cap 11.

Figure 4:
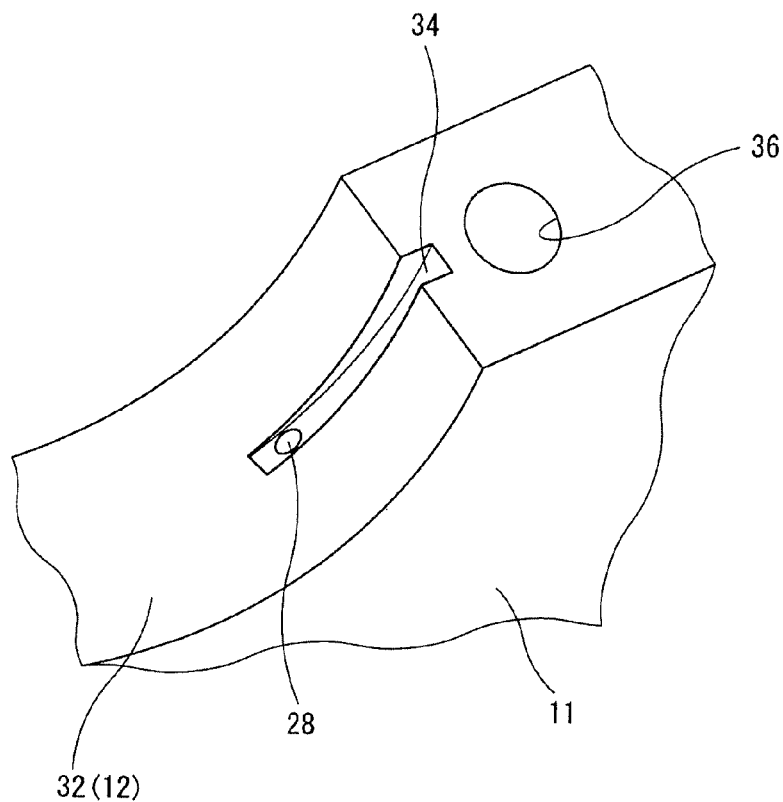
FIG. 4 is a perspective view of the crankshaft bearing part formed at a main bearing cap.

The lower end of in-block passage 27 is opened at the cylinder-block-side bearing surface 31. As shown in FIG. 3 and FIG. 4, a main-bearing-cap-side oil groove 34 is formed at the one end side in the circumferential direction of the main-bearing-cap-side bearing surface 32, and extends along the circumferential direction. As shown in FIG. 4, the main-bearing-cap-side oil groove 34 is positioned at the center in the axial direction of crankshaft bearing part 12. The upper end of in-cap oil passage 28 is opened in main-bearing-cap-side oil groove 34. In addition, there is "36" in FIG. 4, and it is a bolt hole through which bolt 24 is inserted.

Moreover, a main bearing metal 41 as a bearing metal is attached to crankshaft bearing part 12 formed of cylinder-block-side bearing surface 31 and main-bearing-cap-side bearing surface 32. That is, crankshaft 9 is rotatably supported by crankshaft bearing part 12 through the main bearing metal 41.

Figure 5:
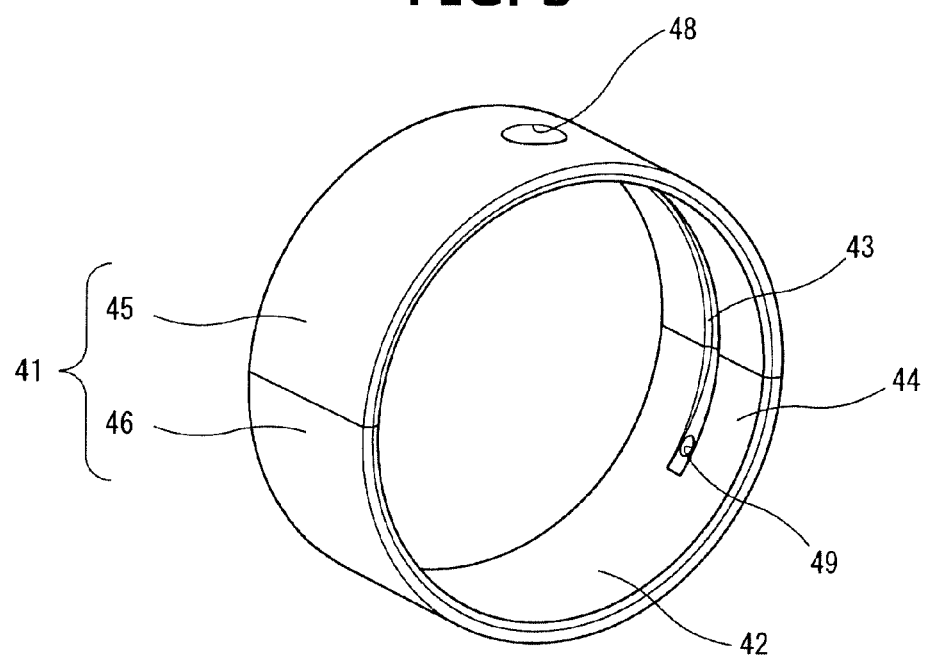
FIG. 5 is a perspective view of a main bearing metal.
Figure 6:
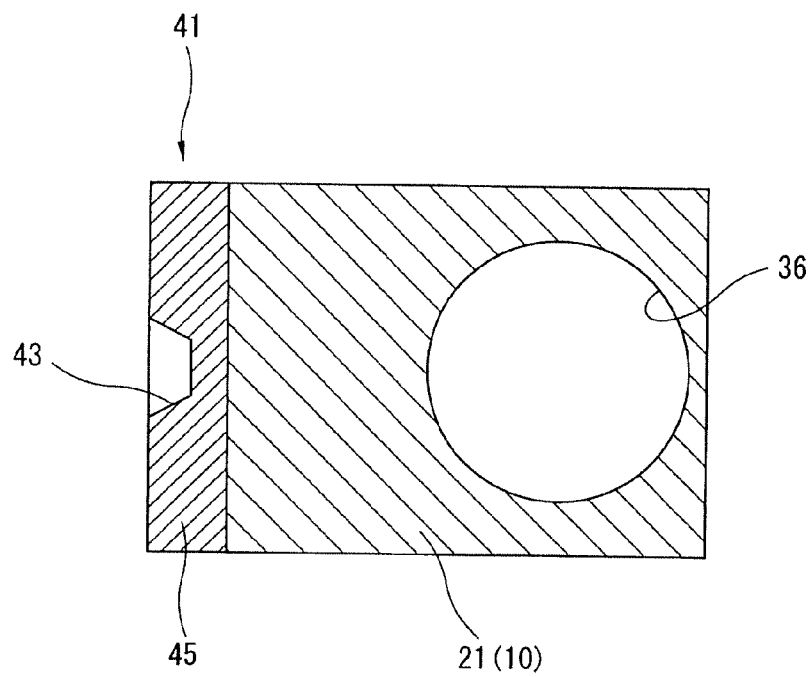
FIG. 6 is a sectional view taken along a line A-A of FIG. 2.
Figure 7:
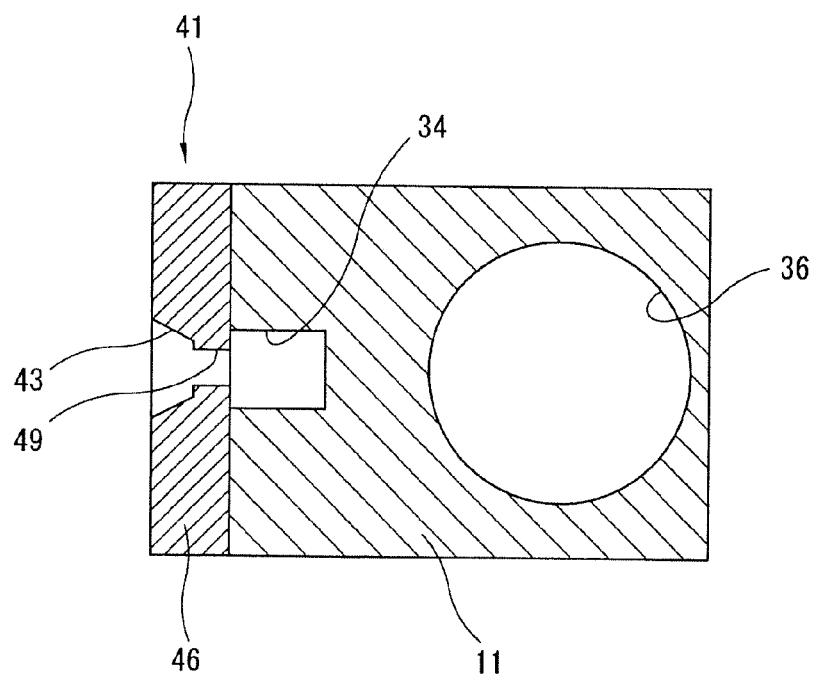
FIG. 7 is a sectional view taken along a line B-B of FIG. 2.

As shown in FIG. 3 and FIG. 5, main bearing metal 41 has a main bearing metal planar portion 42 as a bearing metal planar portion for rotatably supporting crankshaft 9 with the entire inner peripheral surface of the main bearing metal 41, inner peripheral surface at which the main bearing metal planar portion 42 is formed, and a main bearing metal oil groove portion 44 as a bearing metal oil groove portion, in which a main-bearing-metal-side oil groove 43 extending along the circumferential direction of the main bearing metal 41 is formed along the entirety of the inner peripheral surface of the main bearing metal 41, inner peripheral surface at which the main bearing metal oil groove portion 44 is formed. In other words, main bearing metal 41 is formed of main bearing metal oil groove portion 44 in which the main-bearing-metal-side oil groove 43 is formed on the inner peripheral surface thereof and main bearing metal planar portion 42 in which main-bearing-metal-side oil groove 43 is not formed in the inner peripheral surface thereof. As shown in FIG. 6 and FIG. 7, main-bearing-metal-side oil groove 43 is arranged in the center in the axial direction of main bearing metal 41 (a vertical direction in FIG. 6 and FIG. 7).

Main bearing metal 41 is formed of a pair of half-split main bearing metal members 45 and 46 as a bearing metal member. The main bearing metal member 45, which is the upper side of the pair of the half-split bearing metal members 45 and 46, as an upper-side bearing metal member has a semi-cylindrical shape, and is attached so as not to be rotated with respect to cylinder-block-side bearing surface 31. Main bearing metal member 46, which is the lower side of the pair of half-split bearing metal members 45 and 46, as a lower-side bearing metal member has a semi-cylindrical shape, and is attached so as not to be rotated with respect to main-bearing-cap-side bearing surface 32.

In addition, an engaging portion in the form of, for example, a claw, is provided between the inner peripheral surface of crankshaft bearing part 12 and the outer peripheral surface of main bearing metal 41 to suppress the rotation of main bearing metal 41. However, the engaging portion is omitted from the drawings.

Main-bearing-metal-side oil groove 43 extending along the circumferential direction of the inner peripheral surface of upper-side main bearing metal member 45 is formed entirely on the inner peripheral surface of upper-side main bearing metal member 45. That is, upper-side main bearing metal member 45 is formed of only the above-mentioned main bearing metal oil groove portion 44.

In upper-side main bearing metal member 45, a first oil hole 48 is opened and formed through a position corresponding to a lower end opening portion 27a of in-block oil passage 27. The first oil hole 48 is formed in the central position in the circumferential direction of upper-side main bearing metal member 45, and the one end of first oil hole 48 is opened at main-bearing-metal-side oil groove 43 and the other end of first oil hole 48 communicates with the lower end of in-block oil passage 27.

In addition, upper-side main bearing metal member 45 is formed so as to have a symmetrical shape with respect to the central position in the circumferential direction. With this, first oil hole 48 is set at a desired position even if the direction of upper-side main bearing metal member 45 is not considered at the time of assembling it, and assembling work of upper-side main bearing metal member 45 to cylinder-block-side bearing surface 31 therefore becomes easy.

As to lower-side main bearing metal member 46, main bearing metal oil groove portion 44 is formed at each of the one end portion and the other end portion in the circumferential direction of lower-side main bearing metal member 46, and the rest of a part thereof is formed as main bearing metal planar portion 42.

In lower-side main bearing metal member 46, a second oil hole 49 is opened at a position corresponding to main-bearing-cap-side oil groove 34 which is formed at main-bearing-cap-side bearing surface 32.

In one or more embodiments of the present invention, the second oil hole 49 is formed in each of both of the ends of main bearing metal oil groove portion 44 in the circumferential direction of lower-side main bearing metal member 46. That is, as to lower-side main bearing metal member 46, two second oil holes 49 are formed and opened at two spots symmetrical to each other with respect to the central position in the circumferential direction, and lower-side main bearing metal member 46 is formed so as to have a symmetrical shape with respect to the central position in the circumferential direction.

With this, as to lower-side main bearing metal member 46, the one of two oil holes 49 is positioned at a desired position even if the direction of lower-side main bearing metal member 46 is not considered at the time of assembling it, and assembling work of lower-side main bearing metal member 46 to main-bearing-cap-side bearing surface 32 thus becomes easy. In addition, the other of two second oil holes 49 does not communicate with main-bearing-cap-side oil groove 34.

Control shaft bearing part 17 is formed of a main-bearing-cap-side bearing surface 51 having a semi-circular section which is formed at main bearing cap 11 and a control-shaft-bearing-cap-side bearing surface 52 having a semi-circular section which is formed at control shaft bearing cap 16.

The lower end of in-cap oil passage 28 is opened at the main-bearing-cap-side bearing surface 51.

Furthermore, a control shaft bearing metal 53 is attached to control shaft bearing part 17 formed of main-bearing-cap-side bearing surface 51 and the control-shaft-bearing-cap-side bearing surface 52. That is, control shaft 7 is rotatably supported by control shaft bearing part 17 through the control shaft bearing metal 53.

As shown in FIG. 3, the inner peripheral surface of control shaft bearing metal 53 is formed with an oil groove 54 extending circumferentially and entirely. The oil groove 54 is arranged at the center in the axial direction of control shaft bearing metal 53.

Control shaft bearing metal 53 is formed of a pair of half-split control shaft bearing metal members 55 and 55. The pair of the control shaft bearing metal members 55 and 55 is identical to each other as components.

Control shaft bearing metal members 55 have a semi-cylindrical shape, and are attached so as not to be rotated with respect to main-bearing-cap-side bearing surface 51 and control-shaft-bearing-cap-side bearing surface 52.

In control shaft bearing metal members 55, a third oil hole 56 is opened and formed at each of the central positions in the circumferential directions of control shaft bearing metal members 55. The one end of the third oil hole 56 is opened at oil groove 54. In addition, third oil hole 56 is also formed so as to be arranged at the center in the axial direction of control shaft bearing metal member 55, and therefore the upper-side third oil hole 56 always corresponds to in-cap oil passage 28, however two control shaft bearing metals 53 are assembled.

That is, control shaft bearing metal member 55 is formed to have a symmetrical shape with respect to the central position in the circumferential direction, and consequently, third oil hole 56 is arranged at a desired position without considering the direction of control shaft bearing metal member 55 at the time of assembling it. Assembling work of control shaft bearing metal members 55 to main-bearing-cap-side bearing surface 51 and control-shaft-bearing-cap-side bearing surface 52 thus becomes easy.

In addition, an engaging portion in the form of a claw or the like is provided between the inner peripheral surface of control shaft bearing part 17 and the outer peripheral surface of control shaft bearing metal 53 to suppress the rotation of control shaft bearing metal 53. However, it is omitted from the drawings.

In the configuration described above, highly-pressurized lubricating oil in oil gallery 25 is supplied to crankshaft bearing part 12 through in-block oil passage 27. In crankshaft bearing part 12, the lubricating oil is guided to main-bearing-metal-side oil groove 43 formed in the inner peripheral side of main bearing metal 41 from first oil hole 48 of main bearing metal 41, and the sliding surfaces between crankshaft 9 and main bearing metal 41 are lubricated.

A part of the lubricating oil supplied to main-bearing-metal-side oil grove 43 is guided to main-bearing-cap-side oil groove 34 formed at the outer peripheral side of crankshaft bearing part 12 through second oil hole 49 formed at the lower part of crankshaft bearing part 12. The lubricating oil guided to main-bearing-cap-side oil groove 34 enters into in-cap oil passage 28 and is supplied to control shaft bearing part 17.

In control shaft bearing part 17, the lubricating oil is guided to inner peripheral oil groove 54 through third oil hole 56 of control shaft bearing metal 53, so that the entire sliding surfaces between control shaft 7 and control shaft bearing metal 53 are lubricated reliably through oil groove 54.

In this way, in one or more embodiments of the present invention, since the lubricating oil is supplied to control shaft bearing part 17 from oil gallery 25 of cylinder block 10 through crankshaft bearing part 12, it is not always necessary to form control shaft bearing cap 16 into the above-mentioned bearing beam structure, and thereby the flexibility of the design thereof is enhanced and the structure of the oil passages becomes simple.

In addition, main-bearing-metal-side oil groove 43 is not entirely formed at the inner peripheral surface of main bearing metal 41, and the rigidity of main bearing metal 41 is therefore relatively improved, and furthermore, the rigidity of crankshaft bearing part 12 can be relatively improved. Thus, even if a load input from crankshaft 9 is increased caused by high output of an internal combustion engine, rigidity required for crankshaft bearing part 12 can be maintained.

When combustion pressure is maximal during combustion cycle, crankshaft 9 is applied with a load in an arrow F1 direction (see FIG. 3). In lower-side main bearing metal member 46, main bearing metal oil groove portion 44 is arranged out of the circumferential position in the downward load direction F1 with respect to a cylinder axis direction (downward in FIG. 3). When the combustion pressure is maximal, the load which acts on crankshaft 9 can therefore be received on main bearing metal planar portion 42 where contact pressure at the sliding surfaces between crankshaft 9 and main bearing metal 41 becomes relatively small. That is, when the combustion pressure is maximal, it is possible to avoid the influence of the increase of the contact pressure at the sliding surfaces caused by main-bearing-cap-side oil groove 34.

In addition, in one or more of the above embodiments, lower-side main bearing metal member 46 is formed so as to have a symmetrical shape with respect to the central position in the circumferential direction. Only the one end portion side in the circumferential direction of lower-side main bearing metal member 46 may, however, be formed with main bearing metal oil groove portion 44. In this case, lower-side main bearing metal member 46 is attached to main-bearing-cap-side bearing surface 32, so that main bearing metal oil groove portion 44 is arranged at in-cap oil passage 28 side.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A bearing structure comprising:
   a crankshaft rotatably supported by a crankshaft bearing part, formed of a cylinder block of an internal combustion engine and a first bearing cap, through a bearing metal;
   a second shaft rotatably supported by a second shaft bearing part formed of the first bearing cap and a second bearing cap;
   wherein the bearing metal comprises:
      a bearing metal planar portion for rotatably supporting the crankshaft with an entire inner peripheral surface of the bearing metal, the inner peripheral surface at which the bearing metal planar portion is formed;
      a bearing metal oil groove portion formed with an oil groove formed to extend circumferentially in an inner peripheral surface of the bearing metal, the inner peripheral surface at which the bearing metal oil groove portion is formed;
      a first oil hole opening at the oil groove; and
      a second oil hole opening at the oil groove,
      wherein the bearing metal planar portion is set at a position in a load direction where a load is applied to the crankshaft when combustion pressure is maximal,
      wherein the cylinder block is formed with an in-block oil passage communicating with the first oil hole and supplying oil from an oil gallery of the cylinder block to the crankshaft bearing part, and
      wherein the first bearing cap is formed with an in-cap oil passage communicating with the second oil hole and supplying the oil from the crankshaft bearing part to the second shaft bearing part.

2. The bearing structure according to claim 1,
   wherein the bearing metal is formed of a pair of half-split bearing metal members,
   wherein the bearing metal member of the cylinder block side, the bearing metal member which is an upper side of the pair of the half-split bearing metal members, is formed of only the bearing metal oil groove portion,
   wherein the bearing metal member of the first bearing cap side, the bearing metal member which is a lower side of the pair of the half-split bearing metal members, is formed of the bearing metal planar portion and the bearing metal oil groove portion forming one end portion in a circumferential direction of the lower-side bearing metal member,
   wherein the first oil hole is provided at the upper-side bearing metal member, and
   wherein the second oil hole is provided at the lower-side bearing metal member.

3. The bearing structure according to claim 1,
   wherein the bearing metal is formed of a pair of half-split bearing metal members,
   wherein the bearing metal member of the cylinder block side, the bearing metal member which is an upper side of the pair of the half-split bearing metal members, is formed of only the bearing metal oil groove portion,
   wherein the bearing metal member of the first bearing cap side, the bearing metal member which is a lower side of the pair of the half-split bearing metal members, is formed of the bearing metal planar portion and the bearing metal oil groove portion forming one end portion and the other end portion in a circumferential direction of the lower-side bearing metal member,
   wherein the first oil hole is provided at the upper-side bearing metal member, and
   wherein the second oil hole is provided at the bearing metal oil groove portion forming one of the end portions of the lower-side bearing metal member.

4. The bearing structure according to claim 1,
   wherein the internal combustion engine comprises a multi-link-type piston crank mechanism comprising:
      a lower link rotatably supported to a crank pin of the crankshaft;
      an upper link connecting one end portion of the lower link with a piston pin; and
      a control link connecting the other end portion of the lower link with the second shaft, which is a control shaft.

* * * * *